United States Patent [19]

Liu

[11] Patent Number: 5,496,481
[45] Date of Patent: Mar. 5, 1996

[54] ELECTROLYTE FOR ELECTROLYTIC CAPACITOR

[75] Inventor: Yanming Liu, Mundelein, Ill.

[73] Assignee: Boundary Technologies, Inc., Buffalo Grove, Ill.

[21] Appl. No.: 360,463

[22] Filed: Dec. 21, 1994

[51] Int. Cl.$^6$ .................................................. H01G 9/145
[52] U.S. Cl. .................... 252/62.2; 429/194; 429/195; 429/197
[58] Field of Search ............................ 252/62.2; 429/194, 429/195, 197

[56] References Cited

U.S. PATENT DOCUMENTS

| | | |
|---|---|---|
| 1,829,177 | 10/1931 | Yngve . |
| 1,973,602 | 9/1934 | Bergstein . |
| 2,036,669 | 4/1936 | Yngve . |
| 3,487,270 | 12/1969 | Alwitt . |
| 3,546,119 | 12/1970 | Chesnot . |
| 3,547,423 | 12/1970 | Jenny et al. . |
| 3,638,077 | 1/1972 | Chesnot .................... 252/62.2 |
| 3,696,037 | 10/1972 | Lagercrantz et al. . |
| 3,702,426 | 11/1972 | Ross et al. . |
| 3,835,055 | 9/1974 | Chesnot .................... 252/62.2 |
| 4,024,442 | 5/1977 | Anderson . |
| 4,664,830 | 5/1987 | Shinozaki et al. . |
| 4,786,428 | 11/1988 | Shinozaki et al. . |
| 4,812,951 | 3/1989 | Melody et al. . |
| 4,831,499 | 5/1989 | Morimoto et al. .......... 252/62.2 |
| 4,860,169 | 8/1989 | Dapo . |
| 5,112,511 | 5/1992 | Shinozaki et al. . |

*Primary Examiner*—Stephen Kalafut
*Assistant Examiner*—Alan D. Diamond
*Attorney, Agent, or Firm*—Middleton & Reutlinger; Charles G. Lamb; James C. Eaves, Jr.

[57] ABSTRACT

An electrolyte for aluminum electrolytic capacitors comprises a triakylamine having from 8 to 12 carbon atoms, a solvent and a carboxylic acid having at least 4 carbon atoms. The preferred solvent is a combination of butyrolactone with ethylene glycol and the preferred triakylamines are tripropylamine, tributylamine and N,N-diisopropylethylamine.

34 Claims, No Drawings

ELECTROLYTE FOR ELECTROLYTIC CAPACITOR

BACKGROUND OF THE INVENTION

This invention relates to an electrolyte for electrolytic capacitors and more particularly, for an aluminum electrolytic capacitor for use at high voltage.

Current capacitor technology teaches the use of electrolytes composed of straight- and branched-chain dicarboxylic acids in ethylene glycol as replacement for glycol borate electrolytes for high voltage use. The new electrolytes provide longer life and better parameter stability at 105° C. Commercial capacitors containing such electrolytes are available up to 500 V rating. All of these electrolytes contain ethylene glycol as a solvent, and are limited to use at temperatures no lower than −25° C. Below that temperature, the electrolyte resistance becomes so large that the capacitor equivalent series resistance (ESR) is too high for the capacitor to be useful in an electronic circuit.

Electrolytic capacitors are well known for use in a variety of electronic equipment used for data processing, communication, entertainment and power electronics. Generally, these capacitors are made of a capacitor element which is comprised of anode and cathode foils separated by layer(s) of spacer paper. The electrode foils are generally made of aluminum which has undergone etching to increase surface area. The anode foil has undergone an additional formation process to grow an anodic barrier oxide layer that serves as the capacitor dielectric. Short lengths of wire or strips of narrow sheet stock are mechanically bonded to the lengths of anode and cathode foil in the capacitor element; these are used to make electrical connection to the external circuit. The capacitor element is placed into a protective case. Depending upon the capacitor design and size, electrolyte is impregnated into the capacitor element either before or after it is placed in the case. Details of capacitor design and assembly procedures vary with manufacturer. Generally, if wire connectors are used, they pass through an elastomer seal in the top of the case; sheet strip is welded or riveted to terminals embedded in a rigid polymer cover. The cover is then tightly sealed to the case.

Examples of prior art references include U.S. Pat. No. 3,638,077 which teaches an electrolyte capable of being utilized up to a maximum of 400 volts which contains butyrolactone, ethylene glycol, boric acid and tributylamine. Further electrolytes for use in aluminum electrolytic capacitors are taught in U.S. Pat. No. 4,024,442 which teaches an electrolyte composition comprising an acid selected from the group consisting of benzoic acid and toluic acid, ethylene glycol, and at least one organic base which partially neutralizes the acid, such as triethylamine.

SUMMARY OF THE INVENTION

It is an object of the present invention to provide an electrolyte for use in an aluminum electrolytic capacitor.

It is another object of the present invention to provide an electrolyte for use in an aluminum electrolytic capacitor which operates at relatively high voltage conditions.

It is even another object of the present invention to provide high voltage electrolytes that can be used at temperatures below −25° C., and down to −55° C., which makes them suitable for military and certain aerospace application.

An even further object of this invention is to formulate electrolytes that are suitable for use at voltages higher than 500 V, for example, at ratings of 540 V at 105° C.

Even another object of the present invention is to provide capacitors that undergo no more than modest increase in ESR during prolonged operation at 105° C.

These capacitors are required to have properties that remain stable over many thousands of hours of operation, even at elevated temperature. Typical operating life requirements are 2000 hr at 105° C., with maintenance of stable capacitance, low leakage current and low equivalent series resistance (ESR). The ESR depends strongly upon electrolyte resistivity. To avoid catastrophic failure, the electrolyte must be able to support the capacitor operating voltage throughout its operating life, as well as provide some safety margin in case of a voltage surge.

A useful electrolyte will have a high breakdown voltage in combination with low resistivity. These properties will not degrade significantly even after thousands of hours at elevated temperature.

More particularly, the present invention is directed to an electrolyte composition for an electrolytic capacitor comprising:

a trialkylamine having from 8 to 12 carbon atoms, a solvent and a carboxylic acid having at least 4 carbon atoms.

DETAILED DESCRIPTION OF THE PREFERRED EMBODIMENT

Generally, the present invention relates to an electrolyte for use in aluminum electrolytic capacitors with relatively high voltage, particularly for high voltage applications in the range of 200 to 600 volts. The electrolyte comprises a solvent which includes butyrolactone (γ-butyrolactone), in combination with a trialkylamine having from 8 to 12 carbon atoms, and a carboxylic acid having at least 4 carbon atoms. Particularly, it has been found that the concentration of trialkylamine is from about 1 to 8% by weight, the solvent is from about 70 to 95% by weight, and the carboxylic acid is from about 2 to 20% by weight of the total weight of the electrolyte. Water may also be used in concentrations up to 5% by weight.

A protic co-solvent is needed with butyrolactone to improve electrolyte conductivity. Ethylene glycol is a suitable co-solvent for butyrolactone for this purpose. However, too high a concentration of ethylene glycol decreases electrolyte thermal stability. The preferred butyrolactone:ethylene glycol ratio is from 95:5 to 80:20 by volume.

Thermal stability of butyrolactone electrolytes is strongly dependent on the water content in the electrolyte composition. Lower water content is required for higher voltage and/or higher temperature electrolytes. A concentration of 5% has been used at lower voltages, whereas at 600 V it is preferred that the electrolyte formulation exclude water completely. (However, it is realized that trace amounts of water will be present in the chemicals added to the formulation as well as the spacer material.)

The trialkylamines which have been found particularly compatible with butyrolactone include those which are non-nucleophile or poor nucleophile strong bases, such as, N,N-diisopropylethylamine, and medium sized trialkylamines, such as tripropylamine and tributylamine. The N,N-diisopropylethylamine is a preferred trialkylamine as it is particularly useful because it gives much lower resistivity.

In the practice of the present invention, it has been found that the larger and weaker acids withstand higher voltages. Specifically, the carboxylic acids, which are considered to be weak and have suitable acidity for high voltage capacitors, include straight chain dicarboxylic acids having at least 4 carbon atoms, as well as branched chain di- or poly basic acids in which the $CO_2H$ groups are separated by an alkyl chain having 2 or more carbon atoms. The acids having tertiary and/or quaternary $\gamma$-carbon(s) are preferred because the alkyl groups at $\gamma$-carbons(s) donate electrons and weaken the acids. Also, monocarboxylic acids are suitable for the present electrolyte if they have polar group(s) such as a hydroxy, alkoxy or carbonyl and the like at some place in the molecule. The preferred straight chain dicarboxylic acids of the present invention are those acids having 9 or more carbon atoms, which are suitable for higher voltage application, such as those greater than 300 V. The preferred branched chain carboxylic acids of the present invention are the $C_{36}$ dimer and $C_{54}$ trimer acids which are produced by condensation of unsaturated $C_{18}$ acids. These two acids have been found to be particularly useful in a relatively high voltage range up to 600 volts. Moreover, for lower voltage application, such as 200–300 V, smaller acids such as succinic acid ($C_4$) and adipic acid ($C_6$) provide low resistivity with sufficient breakdown voltage. Adipic acid provides low cost, and succinic acid provides lower resistivity.

Optionally, the electrolytes of the present invention may also contain polyalkylene glycols in molecular weights in excess of 200 as a component in the solvent. Particularly, it has been found that polyalkylene glycols having molecular weights from 200 to 3400 and higher are useful for higher voltage applications, particularly 540 volts to 600 volts, wherein the concentration of the polyalkylene glycol is from 1 percent or greater by weight in the total solvent.

Also, depolarizers, such as aromatic nitro compounds which prevent cathodic gassing, have been found useful to support high voltage and provide stable performance at high temperature.

The following examples illustrate the preferred composition of the electrolyte of the present invention. It should be understood, however, that these examples are given for the purpose of illustration only and the examples are not intended to limit the invention which heretofore has been described.

In the examples, the breakdown voltage, $V_b$, is measured in one of two ways: (1) At room temperature using a strip of smooth aluminum foil as the anode in a beaker containing test electrolyte; (2) At 85° C. with a 1"×5" glass-slide sandwich consisting of a formed aluminum foil as anode, etched aluminum foil as cathode, and spacer paper which is impregnated with test electrolyte. The $V_b$ measured at 85° C. with the sandwich was the same, or a little higher, as that measured at room temperature in a beaker.

EXAMPLE I

This Example compares the thermal stability of the breakdown voltage of electrolytes prepared with different amines. In carrying out this Example, five electrolytes were prepared with five different trialklylamines. The electrolytes consisted of 0.3M sebacic acid; 0.45M amine, 75–80% by weight of butyrolactone; about 8% by weight of ethylene glycol; and about 3% by weight of water.

The breakdown voltages shown in Table 1 are values measured with the sandwich/85° C. method.

TABLE 1

|  | TBA[1] | TPA[2] | DIPEA[3] | TEA[4] | DMEA[5] |
|---|---|---|---|---|---|
| pH | 7.9 | 8.2 | 8.0 | 8.1 | 7.7 |
| 25° C.$\rho$, $\Omega$-cm | 1059 | 890 | 630 | 785 | 791 |
| 85° C. $V_b$, volt initial | 480 | 490 | 470 | 460 | 460 |
| 500–570 hrs@ 105° C. | 490 | 465 | 465 | 300 | 170 |

TBA[1] - Tributylamine
TPA[2] - Tripropylamine
DIPEA[3] - N,N-diisopropylethylamine
TEA[4] - Triethylamine
DMEA[5] - dimethylethylamine For straight chain amines, triethylamine, tripropylamine, and tributylamine, the specific resistance ($\rho$) increased with the molecular weight of amine. N,N-diisopropylethylamine was found to have the lowest resistivity. All the amines had similar initial breakdown voltage ($V_b$), but the amines having less than 8 carbon atoms, namely triethylamine and dimethylethylamine had dramatic decreases in $V_b$ after heating whereas those with 8 or more carbon atoms, had stable $V_b$.

EXAMPLE II

In this Example a number of electrolytes are illustrated which are useful for electrolytic capacitors at high voltages.

Tables 2A–2D show the different formulations and the specific resistance and the breakdown voltage of each of the eighteen compositions.

The $C_{21}$ diacid and $C_{22}$ acid shown in Table 2 are 5(6)-carboxy- 4-hexyl-2-cyclohexene-1-octanoic acid (CAS No 53980-88-4) and a polycarboxylic acid (CAS No 68139-89-9), respectively. The $C_{21}$ diacid is produced by reacting linoleic acid with acrylic acid, while $C_{22}$ is produced by reacting linoleic acid with maleic acid. The $C_{36}$ dimer acid and $C_{54}$ trimer acid are produced by intermolecular condensation of unsaturated $C_{18}$ fatty acids. In this work what we call $C_{54}$ trimer acid is actually a mixture of 60% $C_{54}$ trimer acid and 40% $C_{36}$ dimer acid.

TABLE 2A

|  | ELECTROLYTE COMPOSITION NO. | | | | | |
|---|---|---|---|---|---|---|
|  | 2-1 | 2-2 | 2-3 | 2-4 | 2-5 | 2-6 |
| FORMULATIONS: | | | | | | |
| butyrolactone, ml | 90 | 90 | 90 | 90 | 90 | 90 |
| ethylene glycol, ml | 10 | 10 | 10 | 10 | 10 | 10 |
| water, ml | 3.0 | 3.0 | 3.0 | 3.0 | 3.0 | 3.0 |
| succinic acid, g. | — | — | — | — | 2.4 | — |
| azelaic acid, g. | — | 5.6 | — | — | — | — |
| adipic acid, g. | — | — | — | — | — | 2.9 |
| sebacic acid, g. | 6.0 | — | 6.0 | 6.0 | — | — |
| tributylamine, ml. | 10.7 | — | — | — | — | — |
| N,N-diisopropylethyl-amine, ml. | — | 7.8 | 7.8 | 7.8 | 5.3 | 5.3 |
| 4-nitroanisole, g. | — | — | — | 1.0 | — | — |
| PROPERTIES: | | | | | | |
| pH | 7.9 | 8.1 | 8.0 | 7.8 | — | — |
| $\rho$, $\Omega$-cm, @25° C. | 1060 | 655 | 629 | 673 | 527 | 682 |
| 85° C. $V_b$, V | — | — | — | — | 285 | 335 |
| 25° C. $V_b$, V | 480 | 445 | 470 | 460 | — | — |

TABLE 2B

| | ELECTROLYTE COMPOSITION NO. | | | |
|---|---|---|---|---|
| | 2-7 | 2-8 | 2-9 | 2-10 |
| FORMULATIONS: | | | | |
| butyrolactone, ml | 95 | 80 | 80 | 90 |
| ethylene glycol, ml | 5 | 20 | 20 | 10 |
| water, ml | 3.0 | 3.0 | 3.0 | 2.0 |
| sebacic acid, g. | 6.0 | 6.0 | 2.0 | 4.0 |
| benzoic acid, g. | — | — | 3.7 | — |
| N,N-diisopropylethylamine, ml. | 7.8 | 7.8 | 6.9 | 3.5 |
| 4-nitroanisole, g. | — | — | 1.0 | 1.0 |
| PROPERTIES: | | | | |
| pH | 8.1 | 8.1 | 8.0 | 7.9 |
| $\rho$, $\Omega$-cm, @25° C. | 936 | 560 | 450 | 815 |
| 25° C. $V_b$, V | 480 | 460 | 410 | 520 |

TABLE 2C

| | ELECTROLYTE COMPOSITION NO. | | | |
|---|---|---|---|---|
| | 2-11 | 2-12 | 2-13 | 2-14 |
| FORMULATIONS: | | | | |
| butyrolactone, ml | 90 | 90 | 90 | 95 |
| ethylene glycol, ml | 10 | 10 | 10 | 5 |
| water, ml | 1.0 | 3.0 | 3.0 | 1.0 |
| dodecanedioic acid. g. | 4.5 | — | — | — |
| 2,2,5,5,-tetramethylhexanedioic acid. g. | — | 3.0 | — | — |
| 1,12-dodecanedicarboxylic acid, g. | — | — | 3.0 | — |
| $C_{21}$ diacid, g. | — | — | — | 9.0 |
| Tributylamine, ml. | 4.8 | — | — | — |
| Tripropylamine, ml.. | — | 2.0 | 2.0 | — |
| N,N-diisopropylethylamine, ml.. | — | — | — | 3.4 |
| PROPERTIES: | | | | |
| pH | 7.5 | 7.3 | 7.2 | — |
| $\rho$, $\Omega$-cm, @25° C. | 1530 | 1050 | 1426 | 1563 |
| 25° C. $V_b$, V | 580 | 605 | 585 | 575 |

TABLE 2D

| | ELECTROLYTE COMPOSITION NO. | | | |
|---|---|---|---|---|
| | 2-15 | 2-16 | 2-17 | 2-18 |
| FORMULATIONS: | | | | |
| butyrolactone, ml | 90 | 90 | 90 | 90 |
| ethylene glycol, ml | 10 | 10 | 10 | 10 |
| water, ml | 1.0 | 1.0 | 1.0 | 1.0 |
| $C_{22}$ acid, g. | 5.7 | — | — | — |
| $C_{36}$ dimer acid, g. | — | 11 | — | 8.5 |
| $C_{54}$ timer acid, g. | — | — | 8.5 | — |
| Tributylamine, ml. | 4.8 | — | — | — |
| N,N-diisopropylethylamine, ml. | — | 3.4 | 3.4 | 3.4 |
| PROPERTIES: | | | | |
| pH | — | 7.5 | 8.0 | — |
| $\rho$, $\Omega$-cm, @25° C. | 2040 | 1446 | 1465 | 1353 |
| 25° C. $V_b$, V | 545 | 575 | 600 | 610 |

It is noted that the breakdown voltage of all of the aforementioned compositions in Tables 2A, 2B, 2C, and 2D are useful for high voltage use. Higher voltage electrolytes are obtained with larger acids, particularly the $C_{36}$ dimer acid and the $C_{54}$ trimer acid.

EXAMPLE III

The following Example demonstrates the effect of depolarizers in electrolyte compositions of the present invention.

Into an electrolyte which consisted of 90 ml of butyrolactone, 10 ml of ethylene glycol, 2 ml of water, 2 g of sebacic acid and 1.9 ml of tripropylamine, a depolarizer was added and the properties were measured. This was done for each of the depolarizers listed in Table 3. Table 3 also shows the resistivity and breakdown voltage for each solution.

TABLE 3

| nitro compound, % of Total Wt | $\rho 25°$ C. | 85° C. $V_b$ |
|---|---|---|
| none | 1520$\Omega$-cm | 590 V |
| 2% 4-nitroanisole | 1550 | 600 |
| 5% 4-nitroanisole | 1674 | 590 |
| 2% 4-nitrophenetole | 1628 | 590 |
| 2% 4-nitrobenzyl alcohol | 1535 | 590 |
| 2% 4-nitrobenzamide | 1612 | 590 |

Up to 5% depolarizer concentrations increased the resistivity only slightly and did not affect the breakdown voltage. It was found that 4-nitroanisole was preferred because it supports high voltage and has better thermal stability than the other depolarizers.

EXAMPLE IV

This Example shows the effectiveness of polyethylene glycols of different molecular weights, $MW_{peg}$, in the range 200 to 3400, on breakdown voltage of electrolyte compositions of the present invention. The electrolyte compositions of this Example were prepared in the same manner as those prepared in Examples I, II and III. Table 4 shows the electrolyte compositions as well as the breakdown voltage and specific resistance.

TABLE 4

| | Electrolyte Composition No. | | | | | |
|---|---|---|---|---|---|---|
| | 4-1 | 4-2 | 4-3 | 4-4 | 4-5 | 4-6 |
| Formulations: | | | | | | |
| butyrolactone, ml | 90 | 90 | 90 | 90 | 90 | 80 |
| ethylene glycol, ml | 10 | 10 | 10 | 10 | 10 | 10 |
| $H_2O$, ml | 1.0 | 1.0 | 1.0 | 1.0 | 1.0 | 1.0 |
| dodecanedioic acid, g | — | — | — | — | — | 4.5 |
| $MW_{peg}/g$ | none | –200/15 | –400/15 | –1000/10 | –3400/10 | –400/10 |
| $C_{36}$, dimer acid, g | 8.5 | 8.5 | 8.5 | 8.5 | 8.5 | — |
| N,N-diisopropylethylamine, ml | 3.4 | 3.4 | 3.4 | 3.4 | 3.4 | 3.4 |
| PROPERTIES | | | | | | |
| pH | 7.9 | — | 7.8 | — | — | — |
| 25° C., $\rho$, $\Omega$-cm | 1322 | 1939 | 2245 | 1988 | 2037 | 1253 |
| 25° C. $V_b$, volt | 590 | 620 | 630 | 630 | 630 | 580 |

From the data of Table 4 it is shown that polyethylene glycols enhance the breakdown voltage of electrolyte compositions of the present invention.

EXAMPLE V

This Example shows the thermal stability of electrolyte compositions of the present invention at 105° C. The electrolytes were prepared in the same manner as those in the previous examples. The electrolyte composition numbers refer to compositions listed in Tables 2 and 4. The $\Delta\rho$ value is the percentage change in specific resistance from the initial value.

TABLE 5

| Electrolyte Composition No. | hr@105° C. | pH | $\rho 25°$ C./ $\Delta\rho$ | 25° C. $V_b$ | 85° C. $V_b$ |
|---|---|---|---|---|---|
| 2-3 | 0 | 8.0 | 629 | — | 470 |
| | 240 | 7.6 | 764/11% | — | 480 |
| | 1656 | 7.6 | 767/11% | — | 465 |
| 2-3 + 1% by wt. of 4-nitroanisole | 0 | 7.8 | 673 | — | 460 |
| | 336 | 7.3 | 793/18% | — | 460 |
| | 1128 | 7.7 | 734/9% | — | 460 |
| 4-6 + 1% by wt. of 4-nitroanisole | 0 | — | 1306 | 580 | — |
| | 70 | — | 1542/ 18% | 580 | — |
| | 400 | — | 1597/ 22% | 590 | — |
| | 1800 | — | 1621/ 24% | 600 | — |
| 2-16 | 0 | 7.5 | 1446 | 575 | — |
| | 672 | 7.6 | 1413/ –2% | 580 | — |
| | 2136 | — | 1472/ +2% | 590 | — |

From Table 5, it is seen that the breakdown voltage and the specific resistance are quite stable for all of the compositions tested. Most of the changes in the specific resistance occurred during the initial heating.

EXAMPLES VI-A THROUGH VI-C

These Examples are to show the performance of a number of capacitors prepared with electrolyte compositions of the present invention.

Four electrolyte compositions of the present invention were utilized in the making of aluminum electrolytic capacitors. The capacitors were made by recognized prior art techniques. Specifically, a cylindrical capacitor element was wound by wrapping strips of anode and cathode foils, separated by one or more layers of spacer sheet, around a central mandrel. Depending upon the assembly equipment capability, the connector stock was attached to the foil before this winding operation, or as an integral part of it. Before assembly into finished capacitors, these wound elements were vacuum dried to remove excess moisture that may have been absorbed into the spacer paper. (This drying step is a general specification and not peculiar to the electrolytes of the present invention. It may be eliminated if the spacer is not exposed to high humidity conditions during its prior history.) The sequence of subsequent process steps required to fabricate a finished capacitor using this wound element varied depending upon the particulars of the assembly line, capacitor materials, and capacitor design. All of these techniques are well known to those skilled in the art. Thus, in some of the following examples the electrolyte was impregnated into the wound element after it was placed in the capacitor case (VI-A), while for other capacitors the design dictated impregnation before inserting in the case (Examples VI-B and C).

In these examples, before final sealing the cased and impregnated capacitor element was aged. The capacitors were connected to a power supply and a resistor that limited the maximum current to the capacitor. A supply voltage was used that allowed the voltage on the capacitor to slowly rise to its rated value, and then the voltage was held for a selected period of time. The electrolytes of the present invention can be accommodated to the wide variety of aging sequences that are used in the industry. For these examples, the capacitors were first aged at room temperature, and then the temperature was raised to 85° C. while voltage was maintained until the capacitor current dropped to a low value.

After aging the capacitor was sealed, by means appropriate to its particular design.

EXAMPLE VI-A

Electrolyte 2-4 (from Example II) was used in 250 WV capacitors made with two types of spacer. One spacer was two layers of a dense Kraft paper, each 18 μm thick and with a density greater than 0.7 g/cm³. (This is designated here as C/CC.) The other spacer was two layers of a low density Kraft, each layer 28 μm nominal thickness and a density of 0.55 g/cm³. (This is designated here as KK.) The results of load tests at 250 V and 105° C. and of a shelf test at 105° C. with no voltage applied, are shown in Table 6A.

TABLE 6A

| (1) LOAD TESTS | initial | 250 hr | 500 hr | 1000 hr | 2000 hr | 3000 hr | 4000 hr |
|---|---|---|---|---|---|---|---|
| KK paper (average of 5 capacitors) | | | | | | | |
| Capacitance, µF | 553.7 | 546.5 | 546.3 | 545.2 | 548.9 | | |
| 120 Hz ESR[2], mΩ | 114 | 146 | 152 | 153 | 157 | | |
| 105° C. LC[1], µA | 25 | 9.2 | 7.2 | 10.2 | 11.5 | | |
| C/CC paper (average of 4 capacitors) | | | | | | | |
| Capacitance, µF | 615.6 | 623.2 | 623.2 | 623.5 | 625.5 | 623.7 | 620.9 |
| 120 Hz ESR[2] mΩ | 321 | 237 | 234 | 226 | 221 | 248 | 262 |
| 105° C. LC[1], µA | 118 | 15 | 14 | 20 | 26 | 37 | 36 |

| (2) SHELF TESTS: | initial | 500 hr |
|---|---|---|
| (average of 20 capacitors) | | |
| Capacitance, µF | 542 | 531 |
| ESR[2], mΩ | 383 | 371 |
| 25° C./5 min. LC, µA | 9.0 | 34.8 |

[1]Leakage Current
[2]Equivalent Series Resistance

Electrical parameters were very stable over the test duration. Average capacitance changed by no more than 1.6%. The 105° C. leakage currents, measured with voltage applied continuously, decreased initially and remained low throughout the test, even though there was some increase beyond 1000 hr. With the KK spacer the 120 Hz ESR increased by 28% during the first 250 hr and then increased more slowly during further testing, so that after 2000 hr at 105° C. the 120 Hz ESR was only 30% greater than the initial value. With C/CC spacer, the ESR decreased with time up to 2000 hr, and increased thereafter. However, at 4000 hr the ESR was still 18% lower than the initial value.

A way of rating high temperature storage stability is to compare the LC after the shelf test to the CV (capacitance x voltage) product of the capacitor. In this case, that ratio was 35 µA divided by (542 µF×250 V) which equals 0.00025. This shows that very little degradation occurred during prolonged exposure at high temperature in the absence of applied voltage.

EXAMPLE VI-B

Electrolyte composition 2-10 (from Example II) was used in seventeen 450 WV/105° C. capacitors. The anode foil was a 655 V formed foil and the spacer was three layers of the low density Kraft (KK). Load test results are shown in Table 6B (average values).

TABLE 6B

| | initial | 250 hr | 500 hr | 1000 hr | 2000 hr | 3000 hr |
|---|---|---|---|---|---|---|
| Capacitance, µF | 280.2 | 278.8 | 278.2 | 277.1 | 274.9 | 276.1 |
| 120 Hz ESR, mΩ | 209.5 | 195.2 | 196.5 | 196.9 | 211.4 | 219.7 |
| 25° C. LC, µA | 61 | 36 | 42 | 26 | 25 | 33 |
| 105° C. LC, µA | 133 | 47 | 53 | 74 | 36 | 29 |

The capacitance values were stable up to 3000 hours. Both 25° C. and 105° C. leakage currents (LC) were very low.

EXAMPLE VI-C

Eight aluminum electrolytic capacitors were prepared containing electrolytes 2-11 and 2-16 from Example II and were designed to be rated at 540 V, 105° C.. Both electrolytes contained 1% of 4-nitroanisole. The anode foil had been formed to 800 V and the spacer was made of three layers of a paper composed of a blend of polypropylene and Kraft cellulose fibers. These capacitors were tested at 105° C. in the same manner as those in Examples VI-A and VI-B except that the applied voltage was 540 V. The test results are shown in Table 6C.

TABLE 6C

| Electrolyte 2-16 (4 capacitors) | | | | | | |
|---|---|---|---|---|---|---|
| | initial | 250 hr | 500 hr | 1000 hr | 1500 hr | 2500 hr |
| Capacitance, µF | 105.9 | 103.0 | 103.2 | 103.9 | 104.3 | 105.4 |
| 120 Hz ESR, mΩ | 1277 | 1057 | 1048 | 1098 | 1053 | 1154 |
| 25° C. LC, µA | 310 | 24 | 20 | 23 | 18 | 23 |
| 105° C. LC, µA | 130 | 99 | 73 | 65 | 80 | 87 |
| Electrolyte 2-11 (4 capacitors) | | | | | | |
| Capacitance, µF | 112.9 | 112.2 | 112.9 | 113.8 | 114.2 | 114.8 |
| 120 Hz ESR, mΩ | 1595 | 997 | 977 | 1000 | 1187 | 1264 |
| 25° C. LC, µA | 513 | 75 | 57 | 38 | 25 | 24 |
| 105° C. LC, µA | 101 | 77 | 60 | 64 | 81 | 87 |

The capacitance with electrolyte composition 2-16 was initially 5% lower than for capacitors utilizing electrolyte 2-11, but both electrolytes provided stable capacitance up to 2500 hours. With both capacitors there was a substantial decrease in ESR during the initial 250 hr on test, and then ESR increased slowly during further heating. With both electrolytes, LC decreased from the initial value and remained low throughout the test period.

EXAMPLE VII

The ESR of capacitors like those used in Example VI-A, made with electrolyte 2-4 and the KK spacer, was measured at temperatures down to −55° C. For comparison, capacitors containing an electrolyte using dimethylformamide as solvent and the C/CC spacer were run as reference. That is a military design and has the best low temperature properties currently available. Table 7 shows the ratio of ESR at each temperatures to that at 25° C. for each of these two designs.

TABLE 7

| Temperature, 'C. | 2-4 | DMF |
|---|---|---|
| −55 | 16.2 | 8.1 |
| −40 | 7.0 | 4.2 |
| −25 | 3.9 | 2.6 |
| 0 | 1.8 | 1.5 |
| 25 | 1.0 | 1.0 |
| 105 | 0.5 | 0.9 |

At temperatures lower than 0° C., this ratio is no more than two times higher with electrolyte 2-4, and the temperature coefficients of 7× at −40° C. and 16× at −55° C. are reasonable and acceptable.

The present invention has been described with reference to particular embodiments thereof. It will be understood that modifications may be made by those skilled in the art without actually departing from the scope and spirit of the present invention, in accordance with the claims appended hereto.

What is claimed is:

1. An electrolyte composition for electrolytic capacitors comprising:

N,N-diisopropylethylamine, a solvent, and a carboxylic acid wherein the carboxylic acid is a straight chain alkyl dicarboxylic acid or a branched chain alkyl di- or poly-basic acid in which the $CO_2H$ groups of said carboxylic acid are separated by at least 2 carbon atoms.

2. The electrolyte composition of claim 1 wherein said carboxylic acid is a branched chain di-or poly-basic acid having tertiary and/or quarternary γ-carbons.

3. The electrolyte composition of claim 1 wherein the solvent is a combination of butyrolactone and ethylene glycol.

4. The electrolyte composition of claim 1 wherein the solvent includes a polyalkylene glycol having a molecular weight of from 200 to 3400.

5. The electrolyte composition of claim 1 wherein the solvent includes a polyalkylene glycol having a molecular weight of at least 200.

6. The electrolyte composition of claim 1 including water.

7. The electrolyte composition of claim 6, said water being less than 5% by weight.

8. The electrolyte composition of claim 1 wherein the N,N-diisopropylethylamine is from 1 to 8 parts by weight of total electrolyte composition.

9. The electrolyte composition of claim 1 wherein the solvent is from 70 to 95 parts by weight of total electrolyte composition.

10. The electrolyte composition of claim 1 wherein the carboxylic acid is from 2 to 20 parts by weight of total electrolyte composition.

11. An electrolyte composition of claim 1 wherein the N,N-diisopropylethylamine is from 1 to 8 parts by weight of total electrolyte composition, the solvent is from 70 to 95 parts by weight of total composition, and the carboxylic acid is from 2 to 20 parts by weight of total electrolyte composition.

12. The electrolyte composition of claim 11 wherein the solvent is a combination of butyrolactone and ethylene glycol.

13. An electrolyte composition for electrolytic capacitors comprising: N,N-diisopropylethylamine, a solvent, and a carboxylic acid wherein the carboxylic acid is selected from the group consisting of a $C_{36}$ dimer acid and a $C_{54}$ trimer acid, and mixtures thereof.

14. The electrolyte composition of claim 13 wherein the solvent is a combination of butyrolactone and ethylene glycol.

15. The electrolyte composition of claim 13 wherein the solvent includes a polyalkylene glycol having a molecular weight of from 200 to 3400.

16. The electrolyte composition of claim 13 wherein the solvent includes a polyalkylene glycol having a molecular weight of at least 200.

17. The electrolyte composition of claim 13 including water.

18. The electrolyte composition of claim 17, said water being less than 5% by weight.

19. The electrolyte composition of claim 13 wherein the N,N-diisopropylethylamine is from 1 to 8 parts by weight of total electrolyte composition.

20. The electrolyte composition of claim 13 wherein the solvent is from 70 to 95 parts by weight of total electrolyte composition.

21. The electrolyte composition of claim 13 wherein the carboxylic acid is from 2 to 20 parts by weight of total electrolyte composition.

22. The electrolyte composition of claim 13 wherein the N,N-diisopropylethylamine is from 1 to 8 parts by weight of total electrolyte composition, the solvent is from 70 to 95 parts by weight of total composition, and the carboxylic acid is from 2 to 20 parts by weight of total electrolyte composition.

23. The electrolyte composition of claim 22 wherein the solvent is a combination of butyrolactone and ethylene glycol.

24. An electrolyte composition for electrolytic capacitors comprising: N,N-diisopropylethylamine, a solvent, and a carboxylic acid wherein the carboxylic acid is selected from the group consisting of a $C_{21}$ diacid and a $C_{21}$ polyacid.

25. The electrolyte composition of claim 24 wherein the solvent is a combination of butyrolactone and ethylene glycol.

26. The electrolyte composition of claim 24 wherein the solvent includes a polyalkylene glycol having a molecular weight of from 200 to 3400.

27. The electrolyte composition of claim 24 wherein the solvent includes a polyalkylene glycol having a molecular weight of at least 200.

28. The electrolyte composition of claim 24 including water.

29. The electrolyte composition of claim 28, said water being less than 5% by weight.

30. The electrolyte composition of claim 24 wherein the N,N-diisopropylethylamine is from 1 to 8 parts by weight of total electrolyte composition.

31. The electrolyte composition of claim 24 wherein the solvent is from 70 to 95 parts by weight of total electrolyte composition.

32. The electrolyte composition of claim 24 wherein the carboxylic acid is from 2 to 20 parts by weight of total electrolyte composition.

33. The electrolyte composition of claim 24 wherein the N,N-diisopropylethylamine is from 1 to 8 parts by weight of total electrolyte composition, the solvent is from 70 to 95 parts by weight of total composition, and the carboxylic acid is from 2 to 20 parts by weight of total electrolyte composition.

34. The electrolyte composition of claim 33 wherein the solvent is a combination of butyrolactone and ethylene glycol.

* * * * *